US012459800B2

(12) United States Patent
Su

(10) Patent No.: US 12,459,800 B2
(45) Date of Patent: Nov. 4, 2025

(54) PRYING TOOL WITH CARRYING FUNCTION

(71) Applicant: HONG ANN TOOL INDUSTRIES CO., LTD., Taichung (TW)

(72) Inventor: Cheng-Wei Su, Taichung (TW)

(73) Assignee: HONG ANN TOOL INDUSTRIES CO., LTD., Taichung (TW)

( * ) Notice: Subject to any disclaimer, the term of this patent is extended or adjusted under 35 U.S.C. 154(b) by 325 days.

(21) Appl. No.: 18/302,097

(22) Filed: Apr. 18, 2023

(65) Prior Publication Data

US 2023/0391598 A1 Dec. 7, 2023

(30) Foreign Application Priority Data

Jun. 1, 2022 (TW) ................................. 111120432

(51) Int. Cl.
*B66F 15/00* (2006.01)

(52) U.S. Cl.
CPC ................................... *B66F 15/00* (2013.01)

(58) Field of Classification Search
CPC ...................................................... B66F 15/00
See application file for complete search history.

(56) References Cited

U.S. PATENT DOCUMENTS

| | | | | | |
|---|---|---|---|---|---|
| 3,467,405 | A * | 9/1969 | Fogg | B66F 15/00 280/47.24 |
| 5,678,804 | A * | 10/1997 | Lintelman | B66F 15/00 254/133 R |
| 6,354,570 | B1 * | 3/2002 | Christensen | B66F 15/00 254/131 |
| 10,486,952 | B2 | 11/2019 | Su | |
| 11,745,540 | B1 * | 9/2023 | Robinson | B66F 15/00 254/131 |
| 2005/0046131 | A1 * | 3/2005 | Gunderson | B62B 1/14 280/47.27 |
| 2010/0044657 | A1 * | 2/2010 | Patrick | B66F 15/00 254/129 |
| 2023/0129518 | A1 * | 4/2023 | Hardin | B66F 5/02 414/743 |
| 2023/0391598 | A1 * | 12/2023 | Su | B66F 15/00 |

FOREIGN PATENT DOCUMENTS

| | | |
|---|---|---|
| CN | 107098298 A | 8/2017 |
| TW | M256379 U | 2/2005 |

* cited by examiner

*Primary Examiner* — Lee D Wilson
(74) *Attorney, Agent, or Firm* — Muncy, Geissler, Olds & Lowe, P.C.

(57) ABSTRACT

A prying tool includes a main body, a wheel frame and a wheel assembly. The main body is provided with a prying portion, a connecting portion, and a supporting portion curvedly formed between the prying portion and the connecting portion. The wheel frame is detachably connected to the connecting portion. The wheel assembly includes a first wheel rotatably mounted to the wheel frame. Therefore, the prying tool can carry an object by the wheel assembly after prying the object.

8 Claims, 9 Drawing Sheets

PRYING TOOL WITH CARRYING FUNCTION

BACKGROUND OF THE INVENTION

The present invention relates to a prying tool and, more particularly, to a prying tool having a carrying function to carry an object.

U.S. Pat. No. 10,486,952 discloses a pry tool has an anti-slip head. The head has a body having a front end and a rear end and having first and second lateral sides and top and bottom sides extending from the front end to the rear end. The top and bottom sides connect the first and second lateral sides. The bottom side extends curvedly from the front end to the rear end. A partial area of the bottom side includes at least one first recess formed therein such that the bottom side has a rugged curved surface.

However, the pry tool is mainly suitable for prying and lifting an object, but it is inconvenient for carrying the object. As a result, the user need to use other tool to carry the lifted object.

Thus, a need exists for a prying tool to mitigate and/or obviate the above disadvantages.

SUMMARY OF THE INVENTION

An objective of the present invention is to provide a prying tool that includes a main body, a wheel frame and a wheel assembly. The main body is provided with a prying portion, a connecting portion, and a supporting portion curvedly formed between the prying portion and the connecting portion. The wheel frame is detachably connected to the connecting portion. The wheel assembly includes a first wheel rotatably mounted to the wheel frame.

In an embodiment, the wheel frame includes a first support, a second support, an axle shaft and an inserting member. The an axle shaft inserts through the first support and the second support. The first wheel is rotatably mounted to the axle shaft. When the wheel frame is connected to the connecting portion, the first support and the second support are respectively located at two opposite sides of the connecting portion, and the inserting member inserts through the first support, the connecting portion and the second support. When the wheel frame is detached from the connecting portion, the inserting member moves parallel to the axle shaft to detach from the connecting portion and the second support.

In an embodiment, an outer side of the second support opposite to the first support is pivotally provided with a fastening member. An outer periphery of the inserting member is provided with a limiting flange and a hooking recess. When the wheel frame is connected to the connecting portion, the limiting flange abuts against an outer side of the first support opposite to the second support, and the fastening member fastens to the hooking recess so that the inserting member is unable to detach from the connecting portion and the second support. When the fastening member is detached from the hooking recess, the inserting member is able to detach from the connecting portion and the second support.

In an embodiment, the main body is further provided with a prying handle connected to an end of the connecting portion opposite to the supporting portion and elongated straightly from the connecting portion. The inserting member has a width from a side adjacent to the supporting portion to a side adjacent to the prying handle in an axial direction of the prying handle. The inserting member further has a thickness from a side adjacent to the axle shaft to a side opposite to the axle shaft. The width is greater than 2 times the thickness and less than 3 times the thickness.

In an embodiment, an axis distance is defined from the prying handle to the axle shaft in a radial direction of the axle shaft. The first wheel has a wheel diameter greater than 0.8 times the axis distance and less than 1.2 times the axis distance.

In an embodiment, the fastening member is provided with a hooking portion and a toggle turning portion formed as an integrally formed structure. The hooking portion extending along the radial direction of the axle shaft and pivotally arranged on the second support. The toggle turning portion extending parallel to an axial direction of the axle shaft, When the wheel frame is connected to the connecting portion, the hooking portion fastens to the hooking recess. When the hooking portion is detached from the hooking recess, the inserting member is able to detach from the connecting portion and the second support.

In an embodiment, the wheel assembly further includes a second wheel rotatably mounted to the axle shaft. The first wheel is disposed at the outer side of the first support. The second wheel is disposed at the outer side of the second support.

In an embodiment, the wheel assembly further includes a third wheel and a fourth wheel respectively rotatably mounted to the axle shaft. The third wheel is disposed at the outer side of the first support and adjacent to the first wheel. The fourth wheel is disposed at the outer side of the second support and adjacent to the second wheel.

In an embodiment, an outer periphery of the axle shaft is provided with a limiting section disposed between the first support and the second support, a first inserting section inserting through the first support, a second inserting section inserting through the second support, a first mounting section disposed at a side of the first inserting section opposite to the limiting section, and a second mounting section disposed at a side of the second inserting section opposite to the limiting section. Each of the first inserting section and the second inserting section has a width less than a width of the limiting section in the radial direction of the axle shaft. The first mounting section has a width less than a width of the first inserting section in the radial direction of the axle shaft. The second mounting section has a width less than a width of the second inserting section in the radial direction of the axle shaft. The first wheel and the third wheel are rotatably mounted to the first mounting section. The second wheel and the fourth wheel are rotatably mounted to the second mounting section.

In an embodiment, the end of the connecting portion opposite to the supporting portion is protruded with a protruding rod in an integrally formed structure. An end of the prying handle is sleeved on the protruding rod and abuts against the connecting portion.

The present invention will become clearer in light of the following detailed description of illustrative embodiments of this invention described in connection with the drawings.

DETAILED DESCRIPTION OF THE INVENTION

Figure 1:
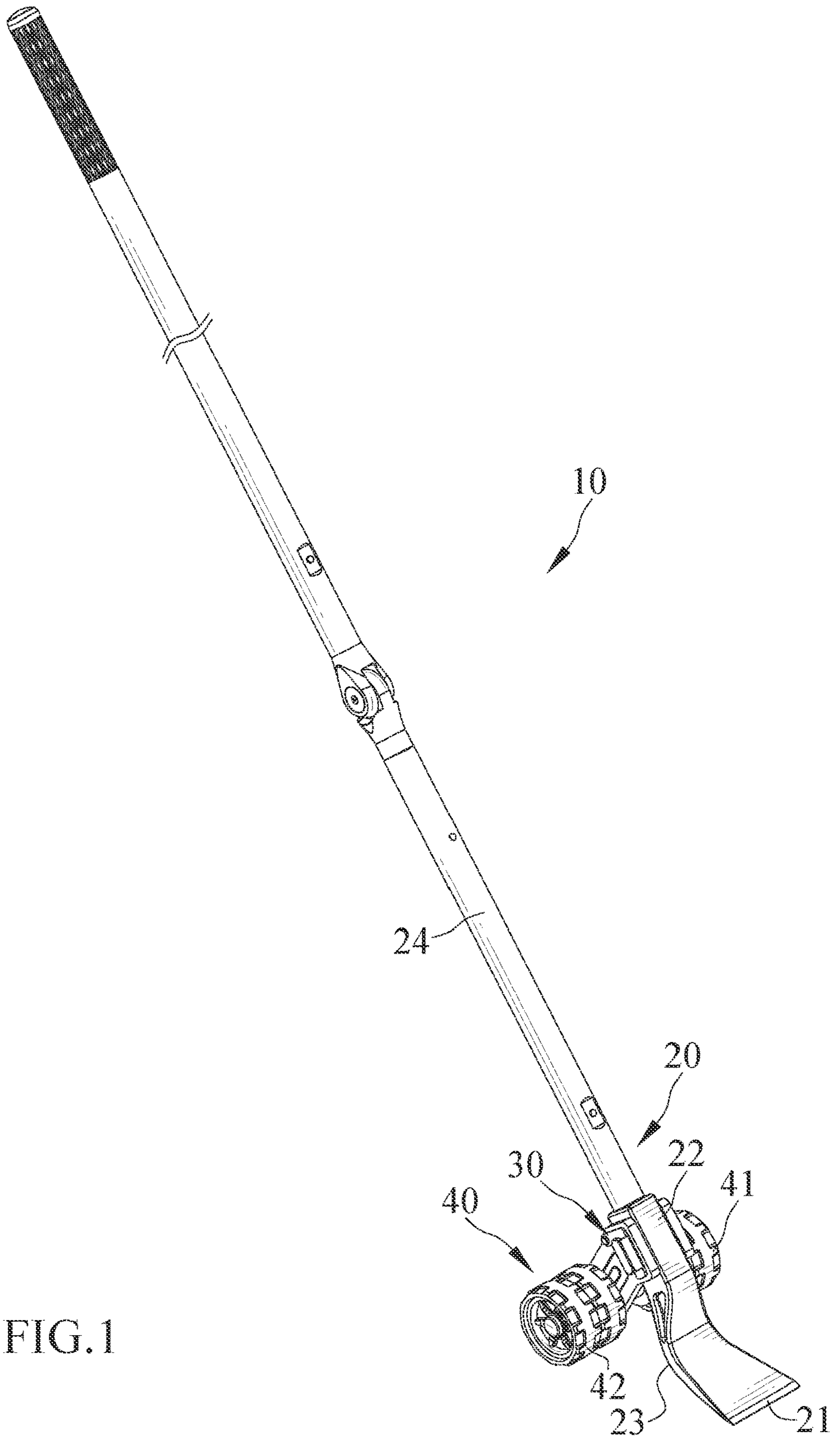
FIG. 1 is a perspective view of a prying tool of a first embodiment according to the present invention.
Figure 2:
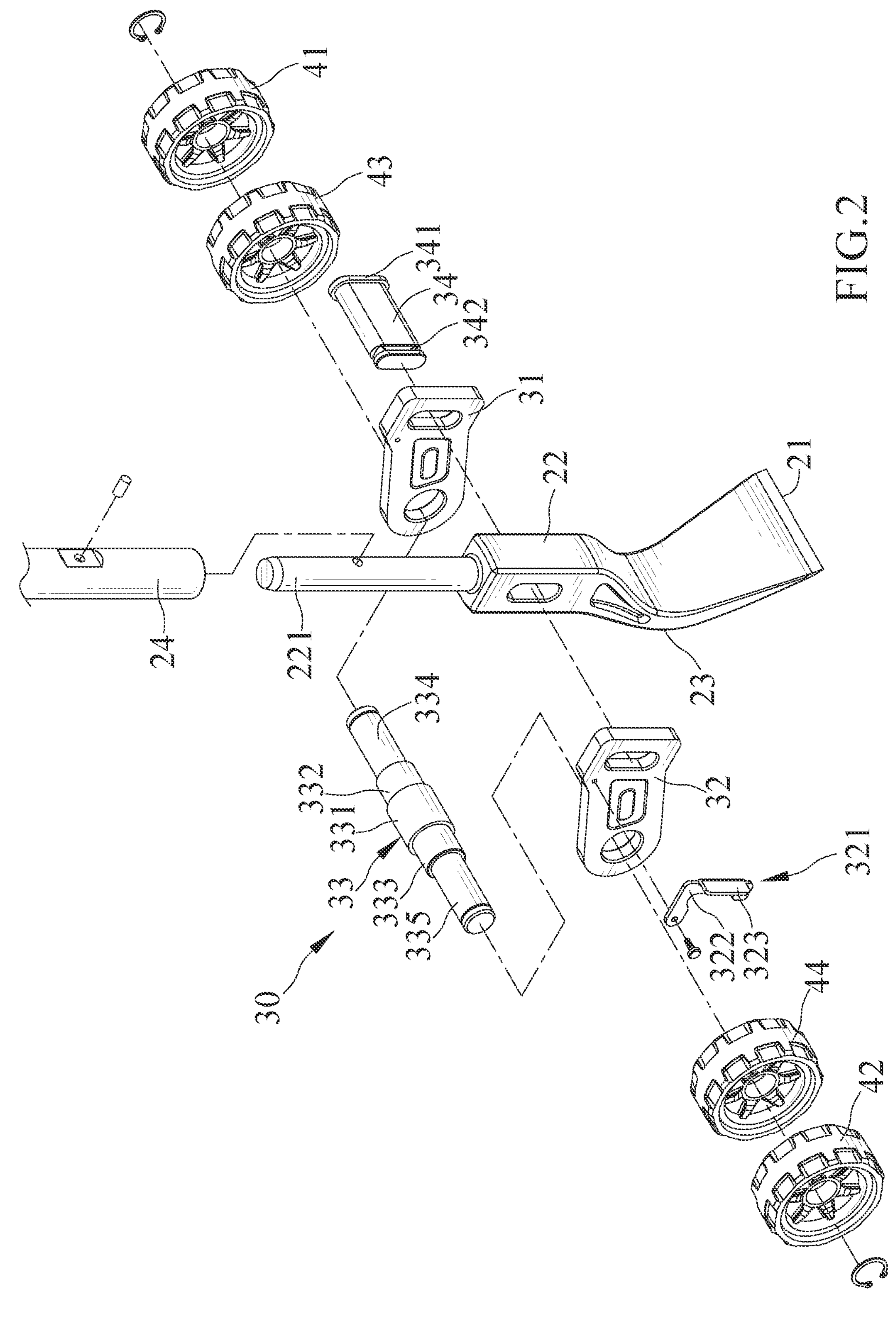
FIG. 2 is a partial exploded perspective view of the prying tool of FIG. 1.
Figure 3:
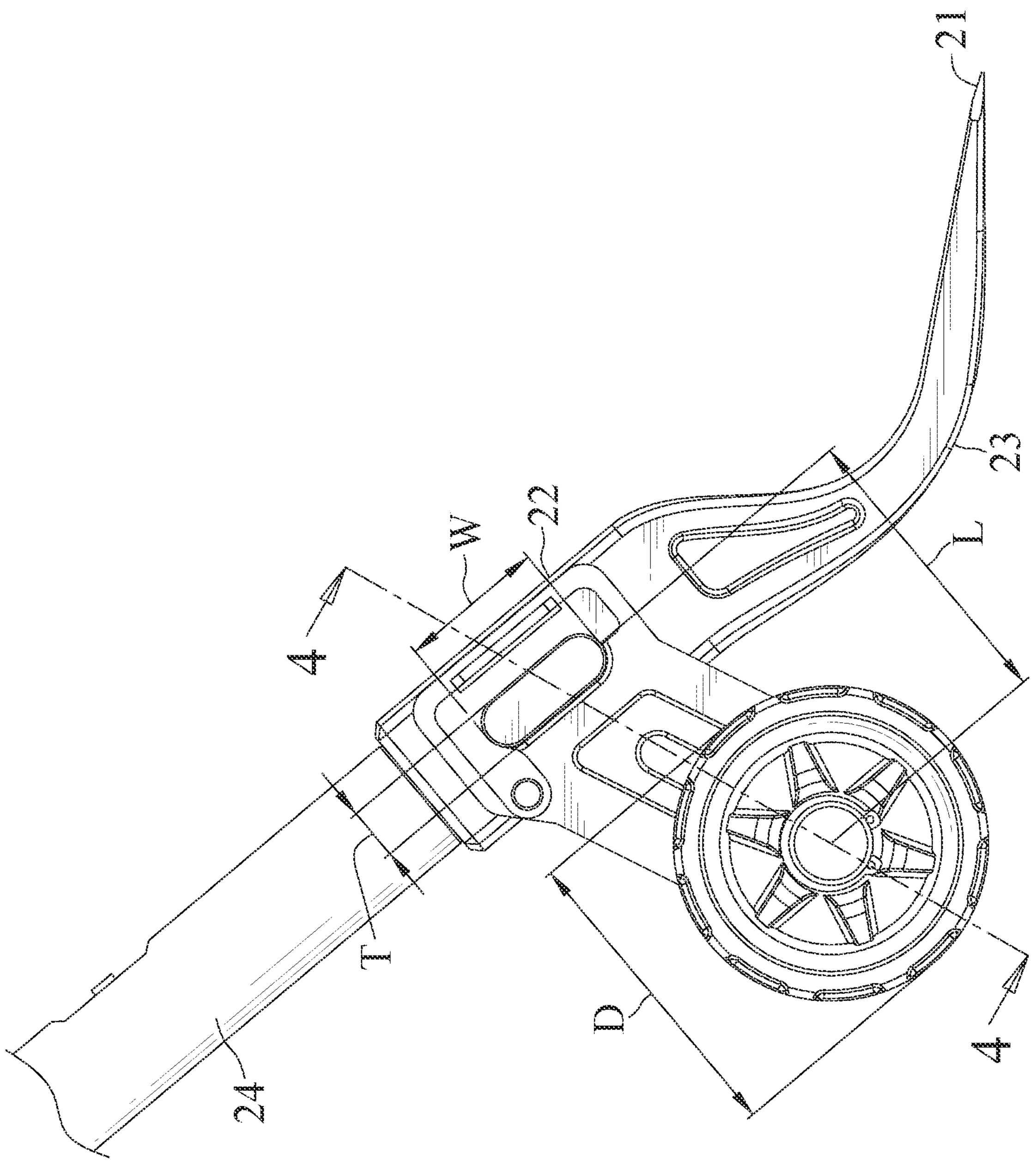
FIG. 3 is a side view of the prying tool of FIG. 1, and shows a fastening member fastening to a inserting member.
Figure 4:
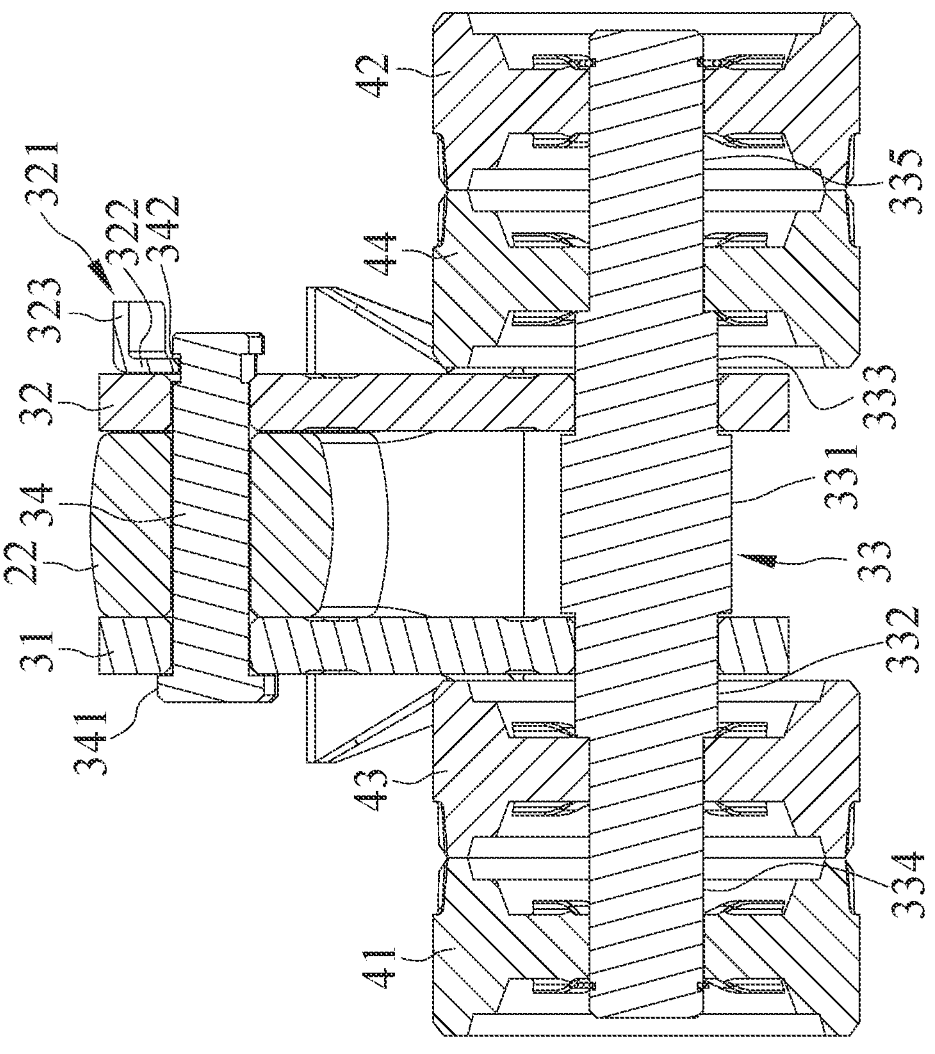
FIG. 4 is a cross sectional view taken along line 4-4 of FIG. 3.
Figure 5:
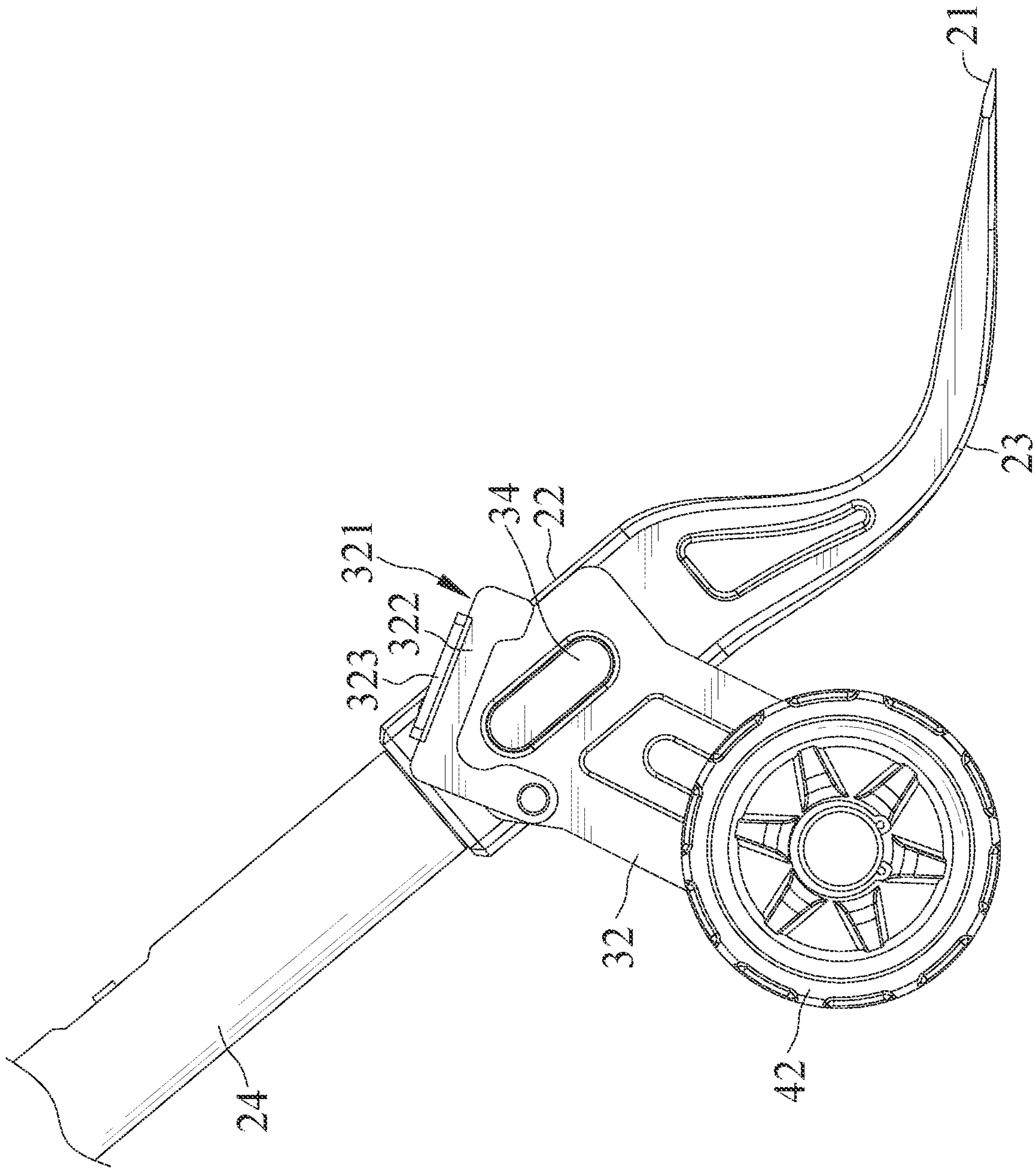
FIG. 5 is side plan view of the prying tool of FIG. 1, and shows the fastening member detached from the inserting member.
Figure 6:
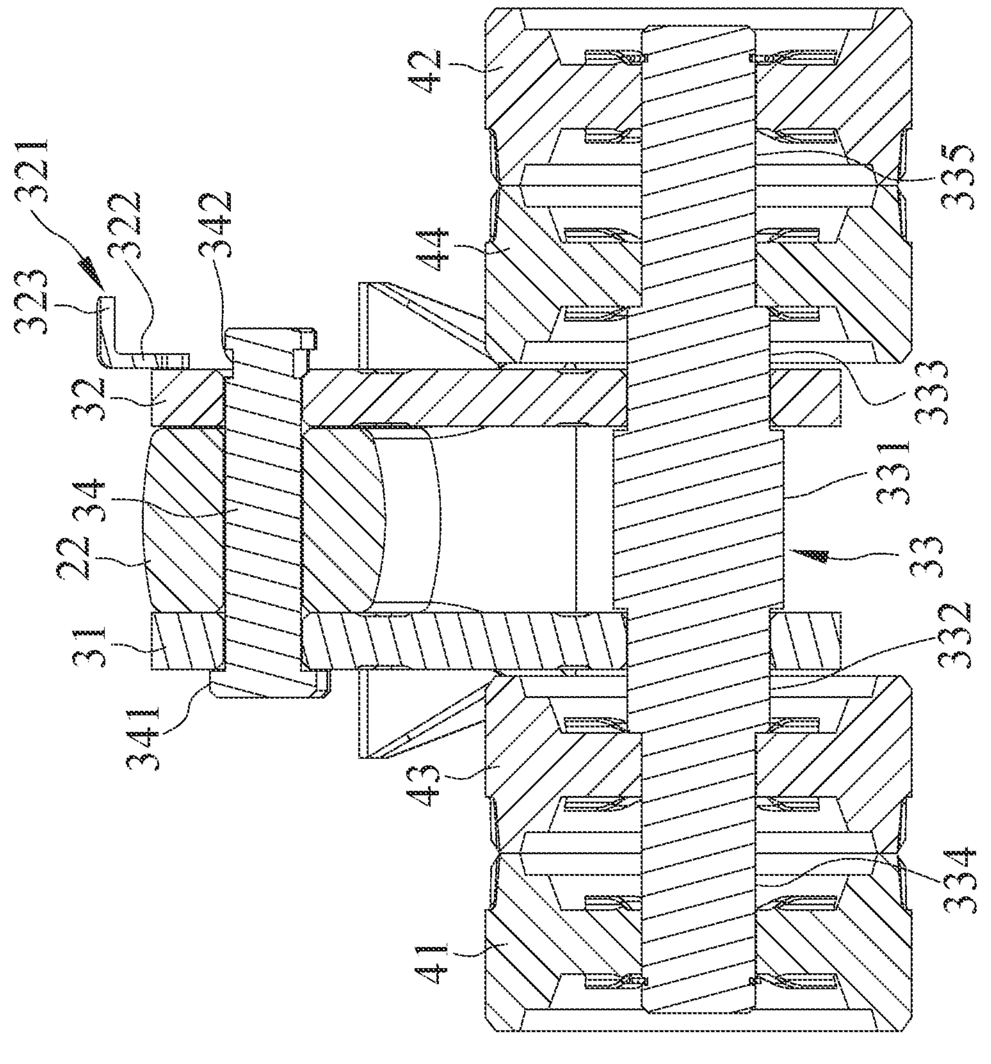
FIG. 6 is a cross sectional view of the prying tool of FIG. 1, and shows the fastening member detached from the inserting member.
Figure 7:
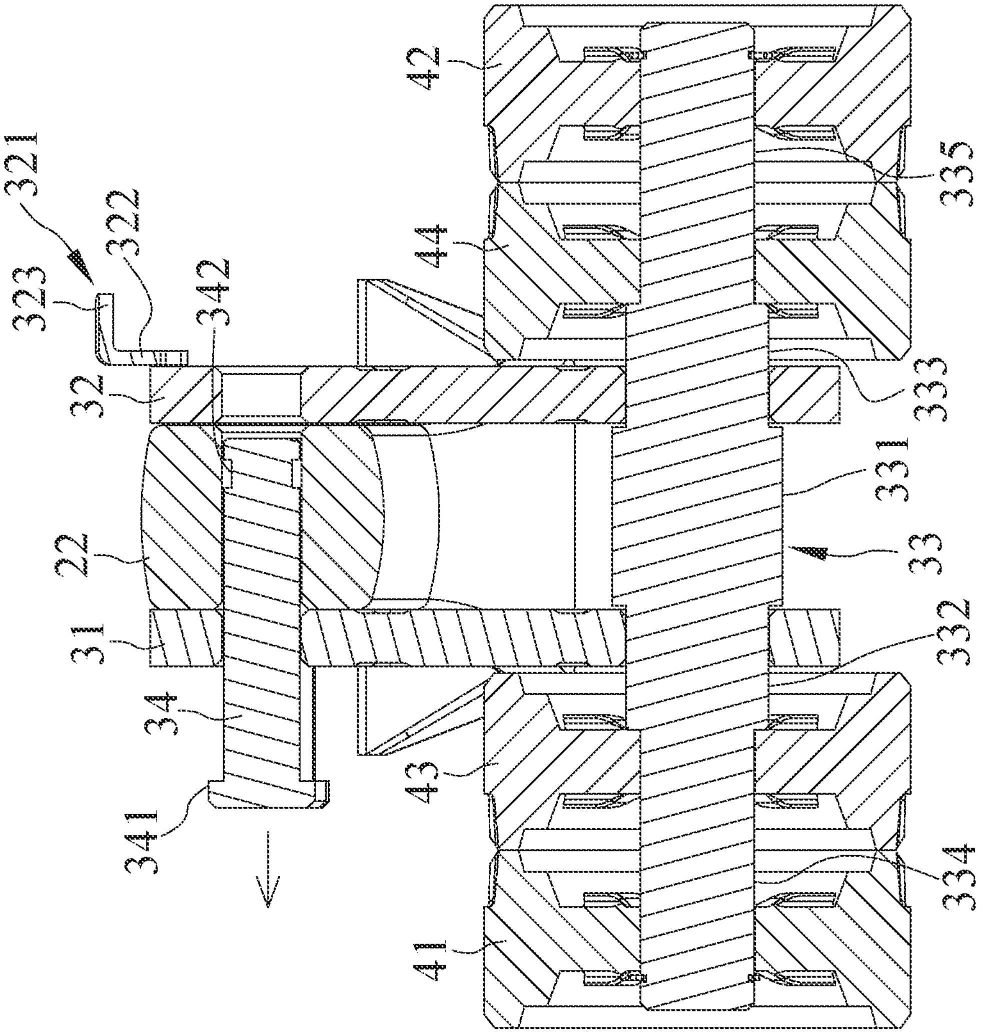
FIG. 7 is a continued view of the FIG. 6, and shows the inserting member detached from a second support.

FIGS. 1-7 show a prying tool 10 of a first embodiment according to the present invention. The prying tool 10 includes a main body 20, a wheel frame 30 and a wheel assembly 40.

The main body 20 is provided with a prying portion 21, a connecting portion 22, and a supporting portion 23 curvedly formed between the prying portion 21 and the connecting portion 22.

The wheel frame 30 is detachably connected to the connecting portion 22.

The wheel assembly 40 includes a first wheel 41 rotatably mounted to the wheel frame 30.

The wheel frame 30 includes a first support 31, a second support 32, an axle shaft 33 and an inserting member 34. The an axle shaft 33 inserts through the first support 31 and the second support 32. The first wheel 41 is rotatably mounted to the axle shaft 33. When the wheel frame 30 is connected to the connecting portion 22, the first support 31 and the second support 32 are respectively located at two opposite sides of the connecting portion 22, and the inserting member 34 inserts through the first support 31, the connecting portion 22 and the second support 32. When the wheel frame 30 is detached from the connecting portion 22, the inserting member 34 moves parallel to the axle shaft 33 to detach from the connecting portion 22 and the second support 32.

An outer side of the second support 32 opposite to the first support 31 is pivotally provided with a fastening member 321. An outer periphery of the inserting member 34 is provided with a limiting flange 341 and a hooking recess 342. When the wheel frame 30 is connected to the connecting portion 22, the limiting flange 341 abuts against an outer side of the first support 31 opposite to the second support 32, and the fastening member 321 fastens to the hooking recess 342 so that the inserting member 34 is unable to detach from the connecting portion 22 and the second support 32. When the fastening member 321 is detached from the hooking recess 342, the inserting member 34 is able to detach from the connecting portion 22 and the second support 32.

The main body 20 is further provided with a prying handle 24 connected to an end of the connecting portion 22 opposite to the supporting portion 23 and elongated straightly from the connecting portion 22. The inserting member 34 has a width W from a side adjacent to the supporting portion 23 to a side adjacent to the prying handle 24 in an axial direction of the prying handle 24. The inserting member 34 further has a thickness T from a side adjacent to the axle shaft 33 to a side opposite to the axle shaft 33. The width W is greater than 2 times the thickness T and less than 3 times the thickness T.

An axis distance L is defined from the prying handle 24 to the axle shaft 33 in a radial direction of the axle shaft 33. The first wheel 41 has a wheel diameter D greater than 0.8 times the axis distance L and less than 1.2 times the axis distance L.

The fastening member 321 is provided with a hooking portion 322 and a toggle turning portion 323 formed as an integrally formed structure. The hooking portion 322 extending along the radial direction of the axle shaft 33 and pivotally arranged on the second support 32. The toggle turning portion 323 extending parallel to an axial direction of the axle shaft 33. When the wheel frame 30 is connected to the connecting portion 22, the hooking portion 322 fastens to the hooking recess 342. When the hooking portion 322 is detached from the hooking recess 342, the inserting member 34 is able to detach from the connecting portion 22 and the second support 32.

The wheel assembly 40 further includes a second wheel 42 rotatably mounted to the axle shaft 33. The first wheel 41 is disposed at the outer side of the first support 31, and the second wheel 42 is disposed at the outer side of the second support 32.

The wheel assembly 40 further includes a third wheel 43 and a fourth wheel 44 respectively rotatably mounted to the axle shaft 33. The third wheel 43 is disposed at the outer side of the first support 31 and adjacent to the first wheel 41. The fourth wheel 44 is disposed at the outer side of the second support 32 and adjacent to the second wheel 42.

An outer periphery of the axle shaft 33 is provided with a limiting section 331 disposed between the first support 31 and the second support 32, a first inserting section 332 inserting through the first support 31, a second inserting section 333 inserting through the second support 32, a first mounting section 334 disposed at a side of the first inserting section 332 opposite to the limiting section 331, and a second mounting section 335 disposed at a side of the second inserting section 333 opposite to the limiting section 331. Each of the first inserting section 332 and the second inserting section 333 has a width less than a width of the limiting section 331 in the radial direction of the axle shaft 33. The first mounting section 334 has a width less than a width of the first inserting section 332 in the radial direction of the axle shaft 33. The second mounting section 335 has a width less than a width of the second inserting section 333 in the radial direction of the axle shaft 33. The first wheel 41 and the third wheel 43 are rotatably mounted to the first mounting section 334. The second wheel 42 and the fourth wheel 44 are rotatably mounted to the second mounting section 335.

The end of the connecting portion 22 opposite to the supporting portion 23 is protruded with a protruding rod 221 in an integrally formed structure, and an end of the prying handle 24 is sleeved on the protruding rod 221 and abuts against the connecting portion 22.

The prying tool 10 can carry an object by the wheel assembly 40 after prying the object, and can achieve labor-saving effect while need to move the object horizontally. When the prying tool 10 is used in a simple prying object environment, removing the wheel frame 30 from the main body 20 and directly using the supporting portion 23 as a fulcrum can prevent the prying tool 10 from shifting during the process of prying and lifting the object. Further, the wheel frame 30 detachably connected to the connecting portion 22 allows the user to choose different modes according to the usage environment.

Figure 8:
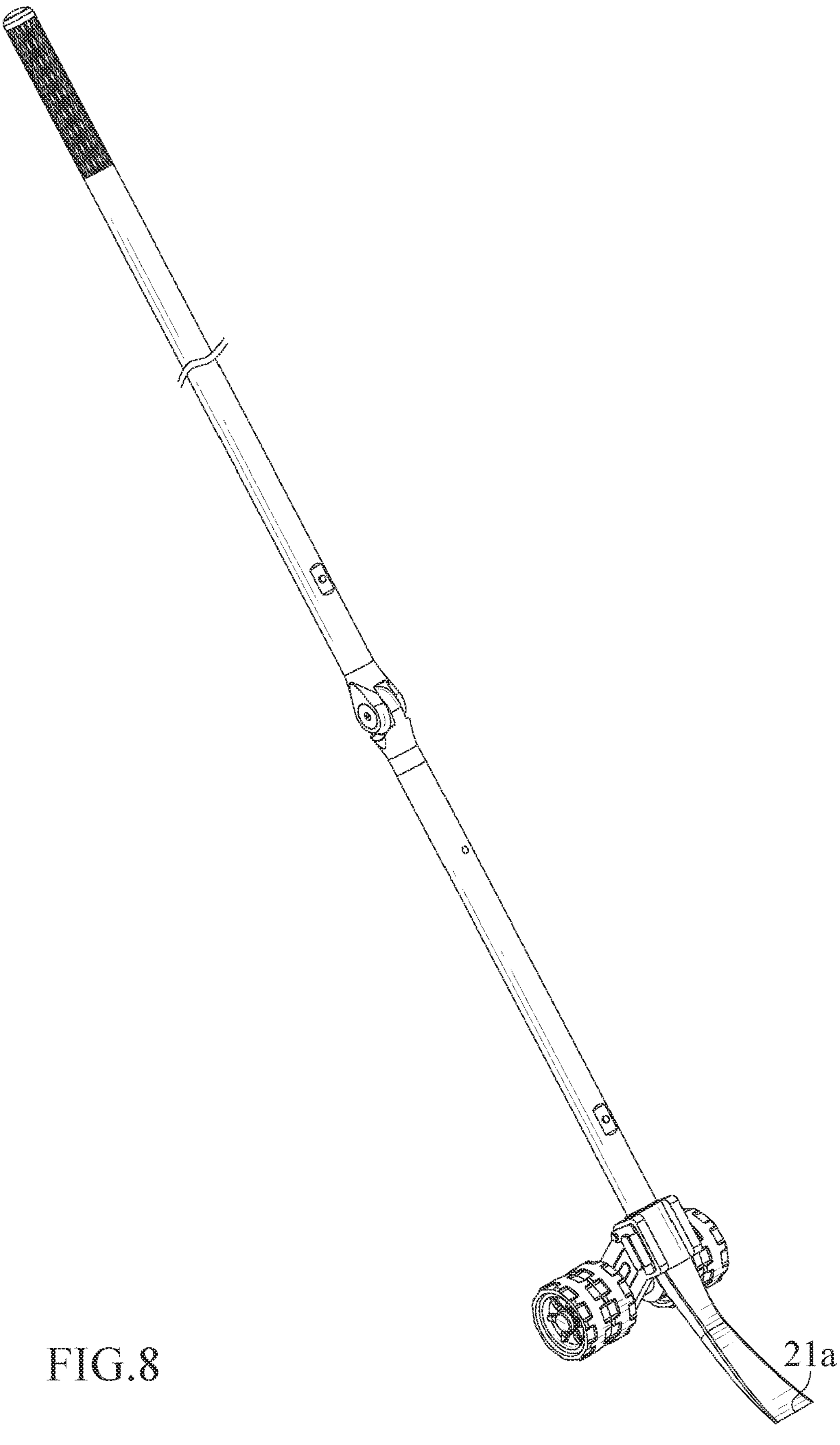
FIG. 8 is a perspective view of a prying tool of a second embodiment according to the present invention.

FIG. 8 shows a prying tool of a second embodiment according to the present invention. The second embedment is substantially the same as the first embodiment. The main differences are that the prying portion 21*a* is set in another form.

Figure 9:
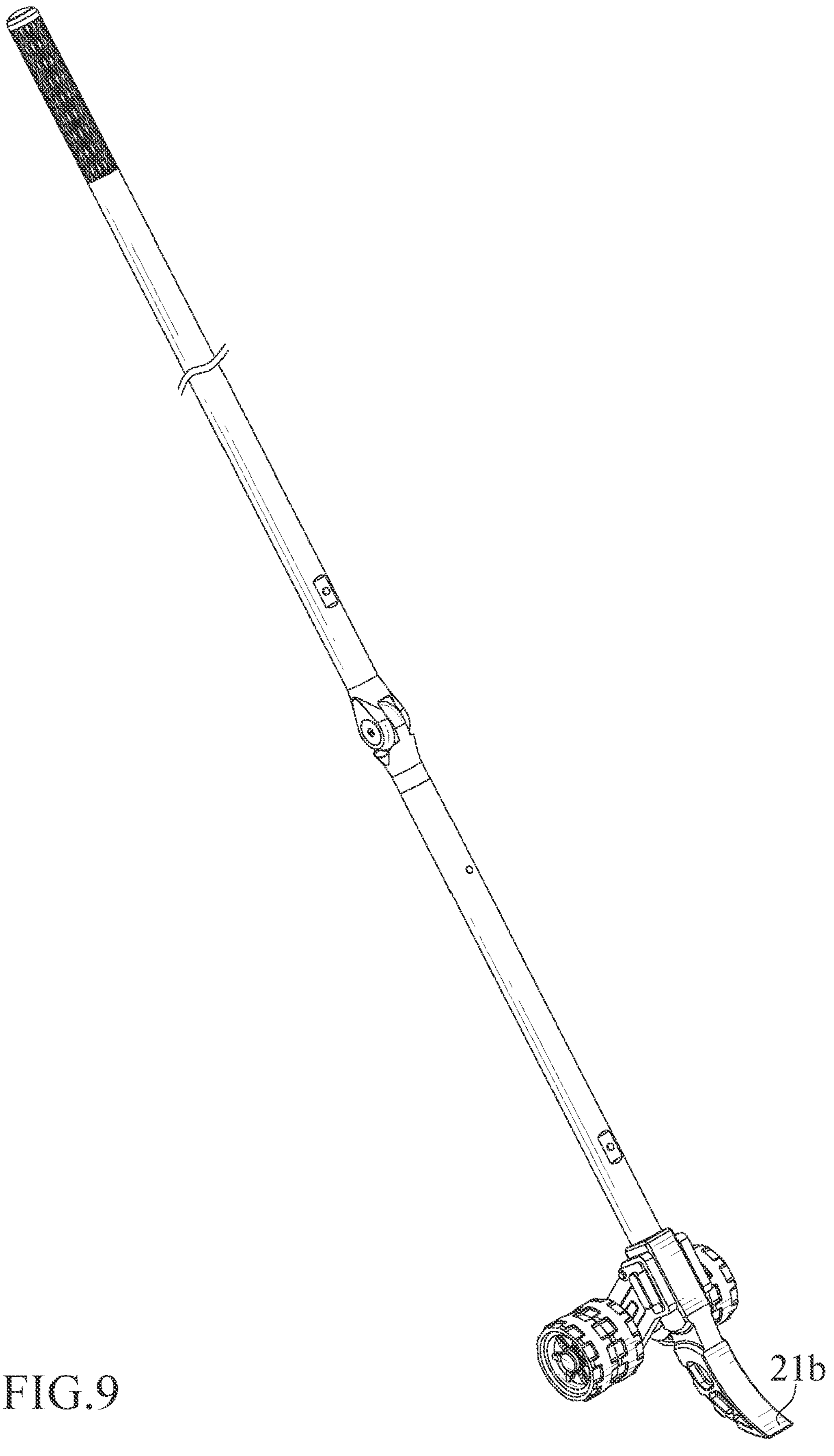
FIG. 9 is a perspective view of a prying tool of a third embodiment according to the present invention.

FIG. 9 shows a prying tool of a third embodiment according to the present invention. The third embedment is substantially the same as the first embodiment. The main differences are that the prying portion 21*b* is set in another form.

Although specific embodiments have been illustrated and described, numerous modifications and variations are still possible without departing from the scope of the invention. The scope of the invention is limited by the accompanying claims.

The invention claimed is:

1. A prying tool comprising:

a main body provided with a prying portion, a connecting portion, and a supporting portion curvedly formed between the prying portion and the connecting portion;

a wheel frame detachably connected to the connecting portion, wherein the wheel frame includes a first support, a second support, an axle shaft and an inserting member, wherein the axle shaft inserts through the first support and the second support; and a wheel assembly including a first wheel and a second wheel rotatably mounted to the axle shaft, wherein the first wheel is disposed at an outer side of the first support and the second wheel is disposed at an outer side of the second support, wherein when the wheel frame is connected to the connecting portion, the first support and the second support are respectively located at two opposite sides of the connecting portion, and the inserting member inserts through the first support, the connecting portion and the second support, and wherein when the wheel frame is detached from the connecting portion, the inserting member moves parallel to the axle shaft to detach from the connecting portion and the second support.

2. The prying tool as claimed in claim 1, wherein an outer side of the second support opposite to the first support is pivotally provided with a fastening member, wherein an outer periphery of the inserting member is provided with a limiting flange and a hooking recess, wherein when the wheel frame is connected to the connecting portion, the limiting flange abuts against an outer side of the first support opposite to the second support, and the fastening member fastens to the hooking recess so that the inserting member is unable to detach from the connecting portion and the second support, and wherein when the fastening member is detached from the hooking recess, the inserting member is able to detach from the connecting portion and the second support.

3. The prying tool as claimed in claim 2, wherein the main body is further provided with a prying handle connected to an end of the connecting portion opposite to the supporting portion and elongated straightly from the connecting portion, wherein the inserting member has a width from a side adjacent to the supporting portion to a side adjacent to the prying handle in an axial direction of the prying handle, wherein the inserting member further has a thickness from a side adjacent to the axle shaft to a side opposite to the axle shaft, and wherein the width is greater than 2 times the thickness and less than 3 times the thickness.

4. The prying tool as claimed in claim 3, wherein an axis distance is defined from the prying handle to the axle shaft in a radial direction of the axle shaft, and wherein the first wheel and the second wheel each have a wheel diameter greater than 0.8 times the axis distance and less than 1.2 times the axis distance.

5. The prying tool as claimed in claim 4, wherein the fastening member is provided with a hooking portion and a toggle turning portion formed as an integrally formed structure, wherein the hooking portion extending along the radial direction of the axle shaft and pivotally arranged on the second support, wherein the toggle turning portion extending parallel to an axial direction of the axle shaft, wherein when the wheel frame is connected to the connecting portion, the hooking portion fastens to the hooking recess, and wherein when the hooking portion is detached from the hooking recess, the inserting member is able to detach from the connecting portion and the second support.

6. The prying tool as claimed in claim 1, wherein the wheel assembly further includes a third wheel and a fourth wheel respectively rotatably mounted to the axle shaft, wherein the third wheel is disposed at the outer side of the first support and adjacent to the first wheel, and wherein the fourth wheel is disposed at the outer side of the second support and adjacent to the second wheel.

7. The prying tool as claimed in claim 6, wherein an outer periphery of the axle shaft is provided with a limiting section disposed between the first support and the second support, a first inserting section inserting through the first support, a second inserting section inserting through the second support, a first mounting section disposed at a side of the first inserting section opposite to the limiting section, and a second mounting section disposed at a side of the second inserting section opposite to the limiting section, wherein each of the first inserting section and the second inserting section has a width less than a width of the limiting section in the radial direction of the axle shaft, wherein the first mounting section has a width less than a width of the first inserting section in the radial direction of the axle shaft, wherein the second mounting section has a width less than a width of the second inserting section in the radial direction of the axle shaft, wherein the first wheel and the third wheel are rotatably mounted to the first mounting section, and wherein the second wheel and the fourth wheel are rotatably mounted to the second mounting section.

8. The prying tool as claimed in claim 3, wherein the end of the connecting portion opposite to the supporting portion is protruded with a protruding rod in an integrally formed structure, and wherein an end of the prying handle is sleeved on the protruding rod and abuts against the connecting portion.

* * * * *